March 22, 1949.   C. A. BURKETT   2,465,058
CIRCULAR SAW
Filed April 2, 1946
Fig. 1.
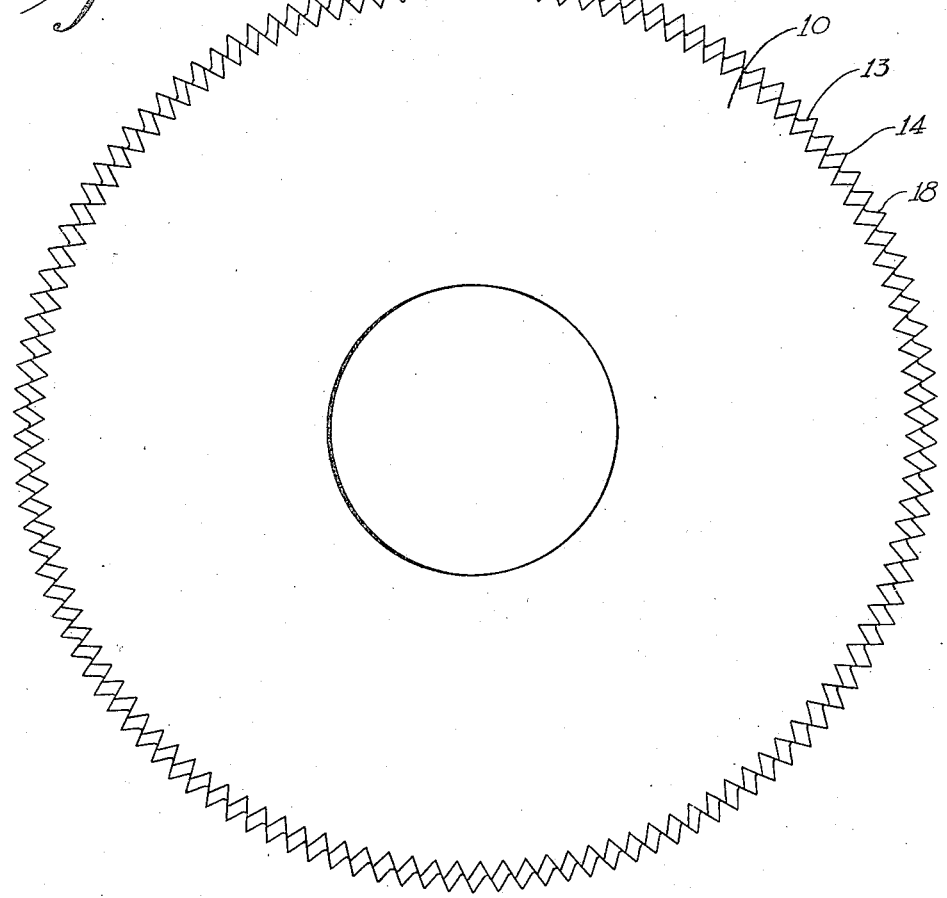
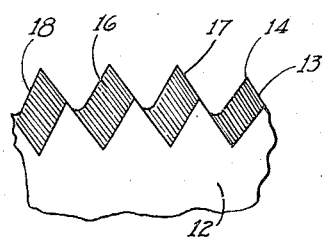
Fig. 2.
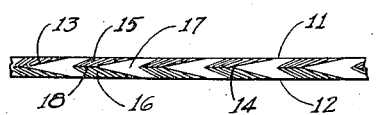
Fig. 3.
Inventor
CLARENCE A. BURKETT
By Warley L. Parrott,
Attorney Patented Mar. 22, 1949

2,465,058

UNITED STATES PATENT OFFICE 2,465,058

CIRCULAR SAW

Clarence A. Burkett, Hartsville, S. C.

Application April 2, 1946, Serial No. 659,063

2 Claims. (Cl. 164—70)

This invention relates to improvements in a circular saw, and more particularly to the novel formation of the teeth thereof.

One of the objects of this invention is to provide a saw which is adapted to cut paper tubes rapidly and efficiently.

Another object is to provide a circular saw blade, the teeth of which require no set, with the result that the cut of the blade is no wider than its thickness.

Another object is to form a circular saw wherein the teeth are characterized by a bevel from each side of the teeth to form a knife-like leading edge.

Another object is to form a circular saw in which the cutting edges of all the teeth are arranged in a plane substantially midway between the sides of the blade.

Other objects and advantages will be readily apparent from a consideration of the following specification and drawing, wherein:

Fig. 1 is an elevation of my improved circular saw blade.

Fig. 2 is an enlarged fragmentary elevation of the saw blade showing several of the teeth embodying my invention, and Fig. 3 is a plan view of Fig. 2.

Referring to the drawing, 10 indicates in general a circular saw blade having two parallel sides 11 and 12.

Extending around the periphery of the blade are a series of teeth 13 having a uniform shape, and being of substantially equal size and evenly placed. Each of the teeth 13 is formed in the shape of a three-sided pyramid and comes to a fine point 14 formed by the meeting of the three planes in the surfaces 15, 16 and 17. Each of the teeth is characterized in that the surfaces 15 and 16 are formed by a bevel extending from opposite faces 11 and 12, respectively, of the blade 10 to form a knife-like leading edge 18. The knife-like leading edges so formed on all of the teeth lie in a plane substantially midway between the sides 11 and 12 of the saw blade 10. The bevel surfaces 15 and 16 extend from below the base of the teeth to the points 14 and each such bevel surface is in the form of a rhomboid.

It will therefore be obvious that each tooth of the saw will have a strong base, a sharp point and a knife-like leading edge. Also, due to the fact that the teeth are similarly positioned and not set or bent outwardly from the blade surface, the saw will perform its function with a maximum of cutting and a minimum of tearing. The uniform side bevelings result in a centrally positioned cutting edge which is but slowly worn down and requires only a small amount of simple filing to restore after use.

The resultant saw blade has been found to be most excellently adapted for cutting paper tubes and similar fibrous articles rapidly and with little waste; and due to the lack of set of the teeth and their general construction, tearing of the paper tubes has been eliminated from the cutting operation.

I claim:

1. A circular saw particularly adapted for cutting paper tubes and the like comprising a circular blade member having parallel side surfaces and formed with a continuous series of equally spaced and uniformly shaped teeth at its periphery, each of said teeth having the form of a three-sided pyramid and extending radially to a fine point defined by the vertex of said pyramid, two sides of said pyramid being oriented equilaterally in the nature of a bevel from each side of said blade member to form a knife-like leading edge for each of said teeth, and the third side of said pyramid forming the back face of said teeth being disposed transversely of said blade member to provide a strong base for each of said teeth.

2. A circular saw particularly adapted for cutting paper tubes and the like comprising a circular blade member having parallel side surfaces and formed with a continuous series of equally spaced teeth at its periphery, each of said teeth having the form of a three-sided pyramid and extending radially to a fine point defined by the vertex of said pyramid, two sides of said pyramid being uniformly oriented in the nature of a bevel equilaterally from each side of said blade member to form a knife-like leading edge for each of said teeth in a single plane substantially midway between the sides of the blade member, and the third side of said pyramid forming the back face of said teeth being disposed transversely of said blade member to provide a strong base for each of said teeth.

CLARENCE A. BURKETT.

REFERENCES CITED

The following references are of record in the file of this patent:

UNITED STATES PATENTS

| Number | Name | Date |
|---|---|---|
| D. 32,820 | Zwiebel | June 12, 1900 |
| 331,195 | Hawley | Nov. 24, 1885 |
| 604,603 | Caruthers | May 24, 1898 |
| 627,113 | Guedel | June 20, 1899 |